United States Patent
Kintzley et al.

(10) Patent No.: US 7,803,855 B2
(45) Date of Patent: Sep. 28, 2010

(54) WOOD COMPOSITES, METHODS OF PRODUCTION, AND METHODS OF MANUFACTURE THEREOF

(75) Inventors: Tom G. Kintzley, Westfir, OR (US); John Helkey, Lowell, OR (US); Ivan Holte, Walterville, OR (US); Lee Roy Johnson, Springfield, OR (US); Todd R. Miller, Eugene, OR (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 685 days.

(21) Appl. No.: 11/437,018

(22) Filed: May 18, 2006

(65) Prior Publication Data

US 2007/0020476 A1 Jan. 25, 2007

Related U.S. Application Data

(60) Provisional application No. 60/687,063, filed on Jun. 3, 2005.

(51) Int. Cl.
- *C08L 97/02* (2006.01)
- *C08L 89/00* (2006.01)
- *B29C 47/00* (2006.01)
- *C09J 189/00* (2006.01)

(52) U.S. Cl. .............. 524/14; 524/13; 524/25

(58) Field of Classification Search ............ None
See application file for complete search history.

(56) References Cited

U.S. PATENT DOCUMENTS

| | | | |
|---|---|---|---|
| 2,580,391 A * | 1/1952 | Babcock et al. | 428/478.4 |
| 2,817,639 A * | 12/1957 | Ash et al. | 524/16 |
| 3,663,267 A * | 5/1972 | Moran et al. | 428/452 |
| 3,925,289 A * | 12/1975 | Sakato et al. | 524/101 |
| 3,953,627 A * | 4/1976 | Turnbo et al. | 427/427 |
| 4,009,310 A * | 2/1977 | Scobbo | 428/95 |
| 4,061,825 A * | 12/1977 | Counsell et al. | 428/355 CP |
| 4,070,314 A * | 1/1978 | Alexander et al. | 524/14 |
| 4,082,903 A * | 4/1978 | Chow | 428/514 |
| 4,182,696 A * | 1/1980 | Wynstra et al. | 524/14 |
| 4,194,996 A * | 3/1980 | Babina et al. | 523/208 |
| 4,212,928 A * | 7/1980 | Arney, Jr. | 428/514 |
| 4,224,846 A * | 9/1980 | Eysel et al. | 82/158 |
| 4,244,846 A * | 1/1981 | Edler | 524/14 |
| 4,311,619 A * | 1/1982 | Seeney et al. | 523/145 |
| 4,376,745 A * | 3/1983 | Johns | 264/109 |
| 4,434,261 A * | 2/1984 | Brugel et al. | 524/109 |
| 4,506,037 A * | 3/1985 | Suzuki et al. | 521/82 |
| 4,594,372 A * | 6/1986 | Natov et al. | 523/208 |
| 4,598,110 A * | 7/1986 | Koyama et al. | 523/446 |
| 4,942,191 A * | 7/1990 | Rogers | 524/17 |
| 5,611,882 A * | 3/1997 | Riebel et al. | 156/272.2 |
| 5,662,731 A * | 9/1997 | Andersen et al. | 106/206.1 |
| 5,767,178 A * | 6/1998 | Kolker et al. | 524/13 |
| 5,834,538 A * | 11/1998 | deHullu et al. | 524/22 |
| 5,891,937 A * | 4/1999 | Berg et al. | 524/13 |
| 5,981,631 A * | 11/1999 | Ronden et al. | 524/13 |
| 6,051,635 A * | 4/2000 | Hatch | 524/14 |
| 6,306,997 B1 * | 10/2001 | Kuo et al. | 527/100 |
| 6,376,584 B1 * | 4/2002 | Galbo et al. | 524/102 |
| 6,429,240 B1 * | 8/2002 | Michelman et al. | 524/13 |
| 6,495,225 B1 * | 12/2002 | Nakajima et al. | 428/35.7 |
| 6,518,387 B2 * | 2/2003 | Kuo et al. | 527/100 |
| 6,783,623 B2 * | 8/2004 | Morin et al. | 156/275.5 |
| 6,964,986 B2 * | 11/2005 | Bachon et al. | 524/2 |
| 7,048,975 B1 * | 5/2006 | Tojo et al. | 428/34.3 |
| RE39,339 E * | 10/2006 | Andersen et al. | 106/206.1 |
| 2002/0032253 A1 * | 3/2002 | Lorenz et al. | 524/11 |
| 2002/0143083 A1 * | 10/2002 | Korney, Jr. | 524/13 |
| 2003/0108701 A1 * | 6/2003 | Bond et al. | 428/35.7 |
| 2004/0140055 A1 * | 7/2004 | Chen et al. | 156/355 |
| 2004/0186203 A1 * | 9/2004 | Koyanagi | 524/17 |
| 2005/0075423 A1 * | 4/2005 | Riebel et al. | 524/17 |
| 2005/0101700 A1 * | 5/2005 | Riebel | 524/17 |
| 2006/0121225 A1 * | 6/2006 | Lees et al. | 428/35.7 |
| 2006/0155012 A1 * | 7/2006 | Riebel | 524/17 |

* cited by examiner

*Primary Examiner*—Mark Eashoo
*Assistant Examiner*—Liam J Heincer

(57) ABSTRACT

An adhesive binder comprising a phenol-formaldehyde resin, polyvinyl ester resin, and a protein is disclosed. The adhesive binder is useful for preparing wood composites.

20 Claims, No Drawings

WOOD COMPOSITES, METHODS OF PRODUCTION, AND METHODS OF MANUFACTURE THEREOF

RELATED APPLICATION DATA

This application claims the benefit of U.S. Provisional Application Ser. No. 60/687,063 filed Jun. 3, 2005, the entire contents of which are hereby incorporated by reference.

FIELD OF THE INVENTION

This invention relates to wood composites comprising phenol formaldehyde resins, and in particular to methods of manufacture of such composites, as well as use of such composites.

BACKGROUND OF THE INVENTION

While phenol-formaldehyde resins have long been used for the preparation of wood composite for exterior use, urea-formaldehyde (UF) resins have been preferred for use in the preparation of wood composites, particularly wood composites for interior use, such as particleboard, medium density fiberboard and other composites made from small pieces of wood. UF resins have been a binder of choice because of their processing advantages and low cost relative to other typical wood adhesives. UF resin-based adhesives have good bonding properties and other characteristics that permit them to be used in high-speed processes for the preparation of the various boards or wood composite products. In the manufacture of composite board products, short press cycles can be achieved with urea-formaldehyde resin-based adhesives. Also, urea-formaldehyde adhesives have a desirable level of "tack", causing adhesive-treated particles to stick to each other, so that mats made from a "tacky" finish tend to be self-sustaining in shape, which facilitates handling during board manufacture. UF resins also cure with a light colored glueline, which is advantageous in decorative panels.

Urea-formaldehyde resins are typically prepared by reacting urea and formaldehyde at a suitable mole ratio to form various methylolated ureas and their higher condensation products. The composition of any particular resin depends, among other factors, on conditions such as temperature, pH and time for the reaction.

Wood composites made with an adhesive binder containing a urea-formaldehyde resin have generally been limited to applications where exterior durability is not required. There is further a growing demand in the marketplace for materials derived in whole or in part from sustainable resources ("Bio-Based" materials), as well as materials that are compliant with environmental standards such as the LEED standards (Leadership in Energy and Environmental Design) as put forth by the USGBC (U.S Green Building Council).

Lower formaldehyde-emitting wood composite products and methods of producing them are thus desirable for manufacturers currently producing UF resin-based adhesive binders. One approach to obtaining lower formaldehyde products has been to use resin compositions with lower F/U molar ratios in the adhesive binders. Such resin compositions tend to be slower curing than the higher mole ratio, more reactive resins. Reducing the mole ratio of formaldehyde in such resins can therefore result in compromised board properties, such as decreased internal bond strengths, due to a lower extent of cure under equivalent pressing conditions. Compromised board properties such as decreased internal bond strengths can lead to delamination.

For at least these reasons, resins and additives that can improve board properties (especially at short press times), while maintaining equivalent, or even lower formaldehyde emissions, are desired. There also remains a need a need in the art for wood products which use an adhesive binder having a cure rate that is comparable to that of urea-formaldehyde, and which has improved hydrolytic stability and internal bond strength.

SUMMARY

The above deficiencies are met by a wood composite comprising the cure product of an adhesive binder composition comprising a thermosetting composition comprising a phenol-formaldehyde resin, a polyvinyl ester resin, and a protein; and a wood material, provided, however, the wood composites of the invention do not contain any added urea-formaldehyde resin as described in credit 4.4 in Green Building Rating System For New Construction & Major Renovations (LEED-NC) Version 2.1, published by the US Green Building Council.

Also disclosed is a process for making a wood composite comprising contacting an adhesive binder comprising a thermosetting composition that comprises a phenol-formaldehyde resin, a polyvinyl ester resin, and a protein to a wood material; consolidating the combined adhesive binder and wood material, and curing the combined adhesive binder and wood material.

A wood composite prepared by the above method is also disclosed.

Also disclosed is an adhesive binder comprising a thermosetting composition comprising a phenol-formaldehyde resin, a polyvinyl ester, and a protein, wherein the adhesive binder contains no urea.

DETAILED DESCRIPTION

Surprisingly, it has been found that a thermosetting composition comprising a phenol-formaldehyde (PF) resin and a polyvinyl ester with a protein additive can be used to prepare an adhesive binder that meets the above needs. The adhesive binder prepared from the thermosetting composition desirably has a high cure rate, high bond strength, and low formaldehyde emissions. As used herein, "cure", "curing," "cured" and similar terms are intended to embrace the structural and/or morphological change which occurs in the adhesive binder as it is heated to cause covalent chemical reaction, ionic interaction or clustering, improved adhesion to the substrate, phase transformation or inversion, and hydrogen bonding.

The thermosetting composition comprises phenol-formaldehyde resins. As used herein, the terms "phenol-formaldehyde" and "phenol-formaldehyde resin" refer to the condensation product and/or precondensate of a monohydroxyaromatic compound and an aldehyde.

Monohydroxyaromatic compounds such as naphthol, phenol, cresols, xylenols, and other substituted monohydroxybenzene compounds are used most commonly, particularly phenol. Substituted and unsubstituted dihydroxyaromatic compounds, including dihydroxyaromatics such as resorcinol may be included, but these have a higher cost, and are therefore typically present in small amounts when used. Suitable substituted monohydroxyaromatics used in the synthesis of the phenol-formaldehyde resins include: alkyl-substituted phenols, aryl-substituted phenols, cycloalkyl-substituted phenols, alkenyl-substituted phenols, alkoxy-substituted phenols, aryloxy-substituted phenols and halogen-substituted phenols, the foregoing substituents containing about 1 to about 26, more specifically about 1 to about 6 carbon atoms. Examples of suitable hydroxyaromatic compounds include phenol, o-cresol, m-cresol, p-cresol, 3,5-xylenol, 3,4-xylenol, 2,3,4-trimethylphenol, 3-ethylphenol, 3,5-diethylphenol, p-butylphenol, 3,5-dibutylphenol, p-amyl phenol, p-cyclohexyl phenol, p-octyl phenol, 3,5 dicyclohexylphenol, p-phenylphenol, p-crotylphenol, 3,5-dimethoxyphenol, 3,4,5-trimethoxyphenol, p-ethoxyphenol, p-butoxyphenol, 3-methyl-4-methoxyphenol, p-phenoxyphenol, resorcinol, and mixtures comprising one or more of these.

The aldehydes reacted with the phenol can include aldehydes such as, for example, formaldehyde, acetaldehyde, propionaldehyde, butyraldehyde, pentanal, hexanal, dodecanal, octadecanal, cinnamaldehyde, furfuraldehyde, benzaldehyde, glutaraldehyde, and mixtures comprising one or more of the foregoing aldehydes. In general, the aldehydes have the formula R'CHO wherein R' is a hydrogen or a hydrocarbon radical of 1 to 8 carbon atoms. The most commonly used aldehyde for preparing phenol-formaldehyde resins is formaldehyde. It will be appreciated by one skilled in the art that the use of the term "aldehyde" in the above context of the condensation of a hydroxyaromatic monomer with an aldehyde additionally comprises aldehyde precursors, also referred to as aldehyde sources or donors, i.e., compounds which can generate aldehyde under the conditions of use, or alternately may provide substantially the same reactive radical expected from the condensation of the hydroxyaromatic monomer with the corresponding aldehyde. Suitable aldehyde precursors include for example, but are not limited to, compounds such as formalin, para-formaldehyde ("paraform"), alpha-polyoxymethylene, hexamethylene tetraamine ("hexamine"), oxazolidines, 1,3,5-trioxacyclohexane, and the like. Suitable aldehyde sources include paraform, which is a solid, polymerized formaldehyde, and formalin solutions which are aqueous solutions of formaldehyde, sometimes with a small amount of methanol, available in 37 wt %, 44 wt %, and 50 wt % formaldehyde concentrations. Formaldehyde also is available as a gas. Any of these forms is suitable for use in preparing a PF resin in the practice of the invention. Typically, formalin solutions are used as the formaldehyde source for ease of handling and use.

The reactants for making the PF resin may also include a small amount of resin modifiers such as ammonia, alkanolamines, or polyamines, such as an alkyl primary diamine, e.g., ethylenediamine (EDA). Modifiers, such as proteins, melamine, ethylene ureas, and primary, secondary and tertiary amines, for example, dicyanodiamide, can also be incorporated into phenol-formaldehyde resins. Concentrations of these modifiers in the reaction mixture can be about 0.05 to about 20.0% by weight, specifically about 0.1 to about 10 wt %, more specifically about 0.5 to about 5 wt % of the phenol-formaldehyde resin solids. These types of modifiers can be used to promote hydrolysis resistance, polymer flexibility and lower formaldehyde emissions in the cured resin.

The hydroxyaromatic compound and aldehyde can be condensed in the presence of a suitable catalyst, where a suitable catalyst can be acidic or basic. Phenol-formaldehyde resins prepared using acidic catalysts are generally referred to as "novolacs", while such resins prepared using basic catalysts are generally referred to as "resoles".

Hydroxyaromatic compound and aldehyde, suitable for use herein, are generally reacted in a mole ratio of aldehyde to hydroxyaromatic compound of about 0.7:1 to about 4:1, specifically about 1.1:1 to about 3.2:1, and more specifically about 1.2:1 to about 2.5:1.

Suitable basic, i.e., alkaline, polymerization catalysts include bases such as sodium hydroxide or caustic soda, though potassium hydroxide or caustic potash, calcium hydroxide, tetraalkyl ammonium hydroxides, barium hydroxide, other basic alkaline salts such as alkali metal carbonate, and mixtures comprising at least one of these bases can also be used.

Suitable acidic catalysts for effecting the condensation of the hydroxyaromatic compound and aldehyde can include mineral acids such as hydrochloric acid, hydrobromic acid, perchloric acid, sulfuric acid, nitric acid, and the like. Also potentially useful are sulfonic acids, examples of which include methanesulfonic acid, ethanesulfonic acid, cyclohexanesulfonic acid, benzenesulfonic acid, p-toluenesulfonic acid, trifluoromethane sulfonic acid, camphorsulfonic acid, and the like. Organic acids, specifically carboxylic acids, are useful. These can include, for example, formic acid, acetic acid, propionic acid, cyclohexanecarboxylic acid, oxalic acid, malonic acid, maleic acid, fumaric acid, citric acid, tartaric acid, 3-mercaptopropionic acid, and the like. Of these, specifically useful acids include hydrochloric acid, sulfuric acid, oxalic acid, and p-toluenesulfonic acid. Mixtures comprising at least one of the foregoing acids can also be used.

Suitable basic, i.e., alkaline, polymerization catalysts include bases such as sodium hydroxide or caustic soda, though potassium hydroxide or caustic potash, calcium hydroxide, tetraalkyl ammonium hydroxides, barium hydroxide, other basic alkaline salts such as alkali metal carbonate, and mixtures comprising at least one of these bases can also be used.

A variety of procedures may be used for condensing reacting the hydroxyaromatic compound and aldehyde components to form an aqueous PF thermosetting resin composition. Process controls such as staged monomer addition, staged catalyst addition, pH control, amine modification and the like are useful in maintaining properties of PF resole resins. It will be recognized that the present disclosure is not to be limited to a restricted class of PF resins or to any specific synthesis procedure.

Condensation of the hydroxyaromatic compound, aldehyde, and catalyst can be carried out by a melt condensation process, typically where acidic catalysts are used to prepare novolacs, or by a solution condensation process. Typically where basic catalysts are used, condensation is carried out using a solution process to prepare resole resins. Specifically herein, suitable phenol-formaldehyde resins for use herein include resole resins, which are available as a solution in a reaction medium. Resole resins are specifically useful as they can have a higher proportion of reactive, cross-linkable methylol groups substituted onto the resin, due to the presence of excess amounts of aldehyde relative to the amount of hydroxyaromatic compound used during the condensation to form the resole resin. The reaction to form a resole resin is typically carried out in an aqueous medium, wherein water alone is a suitable solvent. Also suitable are mixed solvents comprising water and water-soluble lower alcohols, e.g., methanol, ethanol, isopropanol, or a combination comprising at least one of these. In addition, water and other water-soluble organic solvents, e.g., acetone, tetrahydrofuran, a combination comprising at least one of these, and the like, can be suitable. The aqueous medium is present in the resole solution in an amount effective to provide a pan solid contents of about 30 weight percent (wt %) to about 60 wt %, specifically about 35 wt % to about 50 wt %, and more specifically about 40 wt % to about 45 wt % solids. The resole is typically used as a solution in aqueous medium.

Solutions of suitable phenol-formaldehyde resole resins have a non-volatile content (i.e., a solids level) of about 40 to about 75 wt %, specifically about 55 to about 65 wt %. As used herein, the solids content of a composition is measured by the weight loss upon heating of a small, e.g., about 1 to about 5 gram, sample of the composition at about 125° C. for 1.75 hours.

The resole resin solutions can have a viscosity of about 50 to about 1400 cP, specifically about 100 to about 1000 cP, more specifically about 400 to about 700 cP as determined at 25° C. using a Brookfield viscometer. The resole resin solution has a pH of about 9 to about 13, specifically about 10 to about 12. Further, the resole resin solution has a water dilutability of about 1:1 to about 100:1. To provide long-term storage stability, it is advantageous to allow the reaction to proceed until the free formaldehyde content of the reaction mixture is less than about 3 wt %, specifically less than about 1 wt %, and more particularly less than 0.1 wt % of the resin.

A variety of phenol-formaldehyde resins and processes for their preparation are known. The phenol-formaldehyde resin includes, but is not limited to, high molecular weight phenolic resins.

In one embodiment, in an example, a suitable resole resin can be prepared as follows. A clean reactor is charged with 26 parts by weight (pbw) of phenol, 17.5 pbw water, and 6 pbw of a 50 weight percent (wt %) sodium hydroxide solution in water. The mixture is heated to 90° C., and 36.5 parts of a solution of 50 weight percent (wt %) formaldehyde in water is added slowly, to maintain constant temperature and avoid undesirable temperature excursions. The reaction is allowed to proceed to a point where the viscosity of the intermediate product is measured to be about 500 cP Brookfield viscosity at 25° C. The reaction is allowed to cool to about 75° C. and 6 pbw of 50 wt % sodium hydroxide solution in water is added. The reaction is further allowed to proceed to a viscosity of about 600 cP at 25° C., then is cooled to room temperature. A resole resin so prepared has suitable specifications such as: about 50% pan solids; about 6% alkalinity; a Brookfield viscosity of about 100 to about 200 cP measured at 25° C.; and a molar ratio of about 2.2 moles of formaldehyde for each mole of phenol.

The thermosetting composition also comprises a polyvinyl ester. Polyvinyl esters, as used herein, are derivatives of polyvinyl alcohols that are esterified, either before or after polymerization, by reaction with carboxylic acids. Polyvinyl esters can therefore comprise the polymerization product of vinyl esters. Suitable vinyl esters can include, for example, vinyl formate, vinyl acetate, vinyl propionate, vinyl butyrate, vinyl pivalate, vinyl isobutyrate, vinyl pentanoate, vinyl hexanoate, vinyl cyclohexanoate, and combinations comprising one or more of the foregoing. The vinyl ester monomer can also be copolymerized with a heterodifunctional monomer having a reactive group crosslinkable group depending therefrom, such as an epoxy, ester, vinyl, acrylate, methacrylate, isocyanate, methylol, and the like. Specific crosslinkable monomers for copolymerizing with a vinyl ester include N-hydroxymethyl (meth)acrylamide.

Specifically suitable are polyvinyl acetate (PVA) resins, available in cross-linking and non-cross linking forms, as emulsions. Suitable examples of commercially available cross-linkable polyvinyl acetate resins include, but are not limited to, cross-linking PVA resin emulsions such as Polyvac MB-CB and Polyvac MB-42 1, having 3.5 wt % N-hydroxymethyl acrylamide, and non-crosslinking PVA resin emulsions such as Plyamul 300M, each available from Franklin International of Columbus, Ohio. Of these, Polyvac MB-CB is specifically useful.

The cross-linkable polyvinyl ester is present in an emulsion having a percent solids of about 10 to about 90 wt %, specifically about 20 to about 80 wt %, and more specifically about 23 to about 72 wt %, based on the total weight of the mixture. The polyvinyl ester resin solution can have a viscosity of about 1,000 to about 50,000 cP, specifically about 10,000 to about 45,000 cP, more specifically about 20,000 to about 40,000 cP, as determined at 25° C. using a Brookfield viscometer.

The phenol-formaldehyde resin and polyvinyl ester can each be obtained individually, or as a combination of the phenol-formaldehyde resin with either a cross-linkable polyvinyl ester resin or a non-crosslinkable polyvinyl ester resin. A non-limiting example of a commercial product containing a combination of phenol-formaldehyde resin and cross-linkable polyvinyl acetate emulsion is Wonderbond EPR-47, available from Hexion Specialty Chemicals, Inc. of Columbus, Ohio.

The phenol-formaldehyde resin and polyvinyl ester resin are present in a ratio of about 10:90 to about 90:10, specifically about 30:70 to about 70:30, and more specifically about 40:60 to about 60:40, wherein the ratios of PF to PVA are based upon solution weigh The solids content of the solutions of PF and PVA are typical adjusted to approximately 50% solids.

The thermosetting composition further comprises a protein. It has been found that adding a binding-enhancing protein to a combination of a solution of a PF resin and polyvinyl acetate resin provides a wood composite adhesive binder that is useful for adhering wood composites together with improved internal bond strengths. Such proteins are commercially available as agricultural products and by-products. The protein can be an animal protein such as soluble blood (e.g., blood albumen) or casein, or alternatively can be a vegetable protein, examples of which include soy protein from soybeans, wheat gluten, wheat flour, corn protein, other vegetable protein, and the like.

Vegetable proteins are specifically suitable for use herein. Vegetable protein material can be in the form of ground whole grains, beans, or kernels (including the hulls, oil, protein, minerals, and other components); a meal (extracted or partially extracted); a flour (i.e., generally containing less than about 1.5 wt % oil and about 30 to about 35 wt % carbohydrate); or as an isolate (i.e., a substantially pure protein flour containing less than about 0.5 wt % oil and less than about 5 wt % carbohydrate). As used herein in the specification and claims, "flour" includes within its scope material that fits both the definitions of flour and isolate. The vegetable protein is desirably in the form of a protein flour, wherein the adhesive binder and related wood composite products produced from a flour binder are believed to have more desirable physical properties than those made using a meal which has a coarse texture.

The vegetable protein has a mean particle size (i.e., corresponding to the largest dimension) of less than about 0.1 inch (0.25 cm), and more preferably less than about 0.05 inch (0.125 cm). Larger particle sizes may cause the protein material not to be sufficiently soluble or dispersible in the application, to produce an adhesive binder suitable for making wood composites with optimum properties. Where a protein having a large particle size of greater than about 0.1 inch (0.25 cm) is used and blended with the resin before application to the wood particles, the time required to solubilize the material can be undesirably long.

A protein flour, finely ground, is specifically useful due to its generally smaller particle size distribution. Most desirably, the ground vegetable protein has a maximum particle size of that of a flour, i.e., about 0.005 inch (about 0.013 cm). The particle size of commercially available soybean flour is generally less than about 0.003 inch (0.008 cm). Further for example, for some commercially available soybean flours, greater than about 92% can pass through a 325 mesh screen corresponding to a particle size of less than about 0.003 inch (0.008 cm). Thus, a wide range of soy flours can be suitable, such as a soy flour having greater than about 90%, specifically greater than about 95%, of its particles of a size less than about 100 mesh, specifically less than about 200 mesh, and more specifically less than about 400 mesh.

Protein-rich soybean-derived flours, such as soy protein isolate, protein concentrate and ordinary defatted soy flour, which contains about 20 to about 95 wt % protein are each suitable. Of these, ordinary soy flour is desirable for both its ready availability and abundance, and thus its cost effectiveness. Information on soy protein can be found in, for example, Kirk-Othmer, Encyclopedia of Chemical Technology, Fourth Edition, Volume 22, pp. 591-619 (1997).

Other resins may be blended with the thermosetting composition to form the adhesive binder, such as, for example, melamine-aldehyde resins, to replace a portion of the phenol-formaldehyde resin. The adhesive binder may contain additives such as formaldehyde scavengers, plasticizers, thickeners, fillers, flame retardants, lubricants, softening agents, pigments, biocides, wax, acidic cure catalysts, and a combination comprising one or more of these. Suitable formaldehyde scavengers for use in the adhesive binder include, for example, ammonium salts, primary amines, melamine, and ethyleneurea. Suitable plasticizers for use in the adhesive binder include ethylene and propylene glycol oligomers, novolaks, hydroxyaryl compounds, glycerine esters, gum rosins, sugars, phosphate esters and the like. Thickeners, such as wood flour, gums, starches, protein materials, and clays, may be used. Flame retardants, for example silica, may also be used. Wax can be added to enhance water resistance. An acidic cure catalyst can be added to accelerate cure. In general, additives, where used, may be present in an amount that does not affect the desired properties of the adhesive binder.

Addition of an acidic cure catalyst to the adhesive binder can increase the rate of cure of the adhesive binder. The cure rate can be adjusted to a desired speed by catalyst loading. Adhesive binders can be cured at ambient temperatures using free acid acidic cure catalysts. A combination of a moderate increase in acidity and a decreasing temperature can be employed to cure the adhesive. The inherent acidity of the wood can be used to adjust the pH when making particleboard. In this way, a reduced pH varying from about pH 4 to about 6.5 can be obtained, depending on the wood species. Alternately, a latent acidic cure catalyst, or a free acid, may be added if faster cure speeds are required. Suitable latent acidic cure catalysts commonly employed include amine-acid salts, such as $NH_4Cl$ and $(NH_4)_2SO_4$, each of which, in addition to generating a free acid, generates ammonia as a by-product. Free ammonia thus produced can react with any free formaldehyde generated during cure.

Thus, in one embodiment, a phenol-formaldehyde resin and polyvinyl acetate resin are present in a ratio of 20:80 to 80:20 by weight of solids. The thermosetting composition comprises the combined PF resin and PVA resin solids (PF/PVA) with the protein in a weight ratio of about 50:50 to about 90:10, specifically about 60:40 to 80:20, and more specifically about 65:35 to about 75:25, as a weight ratio of PF/PVA solids to protein solids.

The adhesive binder further comprises a solvent to allow spreading of the composition, wherein the solvent suitably comprises water. Thus, the ratio of solids to solvent in the adhesive binder is about 90:10 to about 50:50, specifically about 80:20 to about 55:45, and more specifically about 70:30 to about 60:40.

To maintain the pot life of the adhesive binder and to ensure adequate performance during its use, the pH of the aqueous binder can be adjusted. In this way, a pH of about 5 to about 9, specifically about 6 to about 7.5, is maintained. A lower pH may cause premature curing of the adhesive binder and incompatibility of the components; while a higher pH may retard curing of the composition upon heating during use.

The adhesive binder typically has a final Brookfield viscosity in the range of 5,000 to 50,000 cP at a solids content of 35 to 70%.

The adhesive binder is generally prepared as follows. Solutions of phenol-formaldehyde resin and polyvinyl acetate resin are combined and blended to form a PF/PVA resin solution, the protein is added to the blended PF/PVA resin solution, and the resulting combination is further blended. Alternatively, a commercially available blend of phenol-formaldehyde resin and polyvinyl acetate resin is blended with the protein. Any additional components desired for use in the adhesive binder, such as, for example, filler, plasticizers, formaldehyde scavengers, and thickeners, can be added. Desirably, additives are added pursuant to the blending of the phenol-formaldehyde resin and polyvinyl acetate resin solutions with the protein.

Upon combining of the components, the adhesive binder has a useful manufacturing life ("pot life") which is described by the number of hours during which it remains of a suitable viscosity for use in manufacturing. The adhesive binder thus has a useful pot life of less than about 8 hours, specifically less than about 7 hours, and more specifically less than about 6 hours after combining of the components for the adhesive binder.

Alternatively, it is possible to combine the PF/PVA resins and the protein at a point in the process that does not affect the manufacturable life or properties of the adhesive binder. The protein may thus be applied to the wood pieces separate from the PF/PVA resin, for example, by spraying a solution or dispersion of the protein onto the wood pieces prior to, or after application of a PF/PVA resin adhesive binder to the wood, and overall prior to heating the wood composite mat to consolidate and cure the adhesive binder.

The amount of adhesive binder applied to the wood pieces can vary considerably. Loadings of about 1 to about 45 percent by weight, specifically about 4 to about 30 percent by weight, and more specifically about 5 to about 20 percent by weight, of nonvolatile adhesive binder, based on the dry weight of the wood pieces, is suitable for preparing most wood composite products. In the making of plywood, the adhesive usage is generally expressed as "glue spreads". Glue spreads of about 50 lbs to about 110 lbs of adhesive per about 1000 square feet of glue line are used when a veneer is applied to both sides, and glue spreads of about 25 lbs to about 55 lbs are used when the glue is spread on only one side of the veneer.

The adhesive binder is generally used to adhere lignocellulosic components together. Lignocellulosic materials are cellulosic materials, which are the basic raw materials for articles, may be derived from a large number of natural sources. Suitable sources include sugar cane bagasse, straw, cornstalks, and other waste vegetable matter. In particular however, they are derived form various species of wood in the form of wood fibers, chips, shavings, flakes, particles, veneers, and flours. Processed cellulosic materials include paper and other processed fibers. As is conventional in the art, the resin is combined with or applied to such cellulosic substrate materials by various spraying techniques, whereas it is generally applied to veneers by coaters. Resin applied to the cellulosic components is referred to herein as a coating even though it may be in the form of small resin particles such as atomized particles, which do not form a continuous coating.

Specifically, the adhesive binder is suitable for preparing wood composites. The adhesive binder can be used with a variety of soft and hard woods, such as, for example, Douglas Fir, White Fir, Hemlock, Larch, Southern Yellow Pine, Ponderosa Pine, Spruce, Black Pine, combinations comprising at least one of the foregoing, and the like. Specifically, Douglas Fir, Ponderosa Pine, and Southern Yellow Pine, are useful with the adhesive binder.

Wood composites such as oriented stand board, particleboard, flake board, medium density fiberboard, waferboard, and the like are generally produced by applying the adhesive binder to the wood pieces, such as by blending or spraying the processed lignocellulose materials (wood pieces) such as wood flakes, wood fibers, wood particles, wood wafers, wood strips, wood strands, or other comminuted lignocellulose materials with an adhesive binder composition while the materials are tumbled or agitated in a blender or equivalent apparatus. When making plywood (such as hardwood plywood for interior applications), the adhesive can be applied to the veneers by roll coater, curtain coater, spray booth, foam extruder and the like.

Surprisingly, it has been found that the adhesive binder described herein can provide cure rates for the wood composite which are commercially useful despite the expected slower curing rate of phenolic resin based binder to conventional urea-formaldehyde resin binders. In an embodiment, the adhesive binder composition cures in a time of about 3 to about 10 minutes, specifically about 4 to about 8 minutes, and more specifically about 5 to about 6 minutes. The adhesive binder can have a cure rate that is faster than a similar PF-PVA resin by greater than about 10%, specifically greater than about 15%, and more specifically greater than about 20%. Formaldehyde emissions from wood composites prepared using the adhesive binder are less than 0.05 ppm, specifically less than 0.04 ppm, and more specifically less than 0.035 ppm, as measured according to the large scale chamber test detailed in ASTM E1333.

In addition, the use of protein in the adhesive binder can provide additional desirable advantages. Such advantages include a lighter color in the glue line of the wood composite than would be obtained using an adhesive binder having the PF/PVA resin without added protein. Protein, when used in the adhesive binder, also acts as a viscosity modifier to provide greater viscosity control, specifically wherein the desired viscosity is high, i.e., greater than about 5,000 centipoise. Use of protein is further desirable to reduce the relative cost of an adhesive binder where protein is added than for an adhesive binder prepared without the protein, wherein the adhesive binders are otherwise the same, thus providing an economic advantage to its use. Where a protein is added, these improvements can be obtained without loss of desired properties of the wood composite, such that a wood composite so prepared and cured meets all necessary manufacturing requirements.

Wood composites are generally formed as follows. After applying and/or blending the adhesive and lignocellulose materials sufficiently to form a substantially uniform mixture, the coated wood pieces are formed into a loose mat, which then is generally compressed between heated platens or plates to cure the binder and bond the flakes, strands, strips, pieces, and the like, together in densified form. Conventional pressing processes are generally carried out at temperatures of about 100 to about 300° C., specifically about 110 to about 275° C., more specifically about 120 to about 225° C., and still more specifically about 140 to about 170° C., in the presence of steam generated by liberation of entrained moisture from the wood or lignocellulose materials. Some processes use a combination of press curing with hot platens and heat generated by radio frequency. This combination may permit rapid curing with a reduced press time. The adhesive binder sets or cures at elevated temperatures below the decomposition temperature of the PF/PVA resin mixture and protein components. Higher cure temperatures are not desirable as excessively high temperatures can cause deterioration of the binder composition, which can in turn cause deterioration of the physical and functional properties of the wood composite and lead to increased formaldehyde emissions. Lower temperatures and/or longer times for curing can also be employed to circumvent such undesirable outcomes. Wood composite products made using small wood pieces can also be made using an extrusion process. In such a process, for example, a mixture of the wood particles, adhesive binder, and other additives is extruded through a die to form a flat board.

A typical production cycle for production of a lignocellulosic article such as plywood or particleboard comprises applying resin to a lignocellulosic base material (e.g. a sheet of wood), applying a second sheet of wood, pressing the laminated wood/glue article in a hot press at a temperature of about 100° C. to about 300° C. The time in the press can be about 0.1 to about 30 minutes. Lamination pressures of about 50 to about 1000 psi are also used. After application of these conditions to the wood product, the article is generally cured to the desired extent, and can be removed from the press. The total portion of the cycle affected by the cure rate of the adhesive binder is about 2 to about 20 minutes specifically about 5 to about 15 minutes, of the overall process. In an embodiment, use of the adhesive binder allows for a cure time of about 5 to about 6 min., a cure temperature of about 100 to about 300° C., and a cure pressure to about 100 to about 150 psi which provides a benefit in the form of a comparable throughput to that obtained using UF resins.

In an embodiment, interior grade plywood is prepared by assembling wood veneers into panels and consolidating the panels under heat and pressure. This is usually done using a steam hot-press with platen temperatures of about 100 to about 300° C. and pressures of about 75 to about 250 psi. In these processes, the moisture content of the lignocellulose material can be about 2 to about 20 wt %, prior to being blended with the aqueous adhesive binder. In an exception, medium density fiberboard, where the adhesive resin typically is applied to green (i.e., undried) wood fiber, and then passed through a dryer, has a lower moisture content.

In an embodiment, for example, when manufacturing particleboard, the adhesive binder is sprayed onto the wood particles in an amount of about 4 to about 20 parts by weight (pbw) of resin solids per 100 pbw of dry wood. The resin-treated wood particles are formed into a mat, and compacted in a hot press to the desired density. Particleboard panels can be made to have a density in the range from about 35 to about 60 lbs/ft$^3$. Typically, the thickness of particleboard falls in the range from about one-eighth inch to two inches.

EXAMPLES

The following examples are intended to be illustrative only and are not intended to be limiting thereto.

The test panels made using the adhesive in Example 4 were compared with test specimens cut from Douglas Fir, Spruce and Black Pine and were tested for emissions of formaldehyde under a dynamic flow of air within a chamber in accordance with the "large chamber test" for determining formaldehyde emissions in accordance with the test procedure setforth in ASTM E1333, which are incorporated by reference herein their entirely.

A "3 cycle soak" test is a standard plywood industry test ANSI/HPVA HP-1-1994, which is incorporated herein in its entirety by reference, wherein 127 mm by 50.8 mm (5 inches by 2 inches) specimens from each test panel of plywood are submerged in water at 24 plus or minus 3 degrees C. for 4 hours and then dried at a temperature between 49 and 52 degrees C. for 19 hours with sufficient air circulation to lower the moisture content of the specimens to within the range of 4 to 12 percent of the overall dry weight of the panel The cycle is repeated until all specimens fail or until three cycles have been completed, whichever occurs first. A specimen is considered to fail when any single delamination between two plies is greater than 50.8 mm in continuous length, over 6.4 mm in depth at any point, and 0.08 mm in width, as determined by a feeler gage 0,08 mm thick and 12.7 mm wide. Delaminations due to tape at joints of inner plies or defects allowed by the grade are disregarded. Five of the 6 specimens must pass the first cycle and 4 of 6 specimens must pass the third cycle in 90% of the panels tested.

Within any given selection of test panels, 95% of the individual specimens must pass the first cycle and 85% of the specimens must pass the third cycle to achieve a "passed" rating.

The phenol-formaldehyde and polyvinyl ester resin that is particularly useful as an embodiment for use with the protein in making an adhesive is prepared using an aqueous phenol-formaldehyde resole resin with a molar ratio of formaldehyde to phenol of about 1.9 to about 2.1, a final viscosity of about 3,500 to 4,600 cP and an alkalinity content of about 1.3-1.7. The resole will typically have an average molecular weight of about 1050 to 1350 and can have a melamine content of 1-5%. The resole resin is added portion-wise with stirring to an aqueous emulsion of a polyvinyl acetate emulsion, such as a commercially available crosslinking PVA emulsion, Polyvac MB-CB (containing about 3.5% of N-methylacrylamide, available from Franklin International of Columbus, Ohio.

Once the entire phenolic resole is charged, the pH of the mixture is adjusted to a range of about 5.2-5.5 with methane sulfonic acid. Ethyleneurea is then added with stirring in a quantity sufficient to act as a scavenger for any free formaldehyde. Conventional antifoam agent, such as Foamkill WT, available from Crucible Chemical Company is then added with EDTA color stabilizer and the final solids content is adjusted to about 50% by the addition of water.

A study was done using a phenol-formaldehyde resole resin and commercially available polyvinyl acetate resin emulsion Polyvac MB-CB crosslinking PVA and which is then mixed with a commercially available soy protein flour to confirm that the adhesive would meet the plywood industry 3 cycle soak test standard.

TABLE 1

| Material | Description | Source |
|---|---|---|
| PF resin | Phenol-formaldehyde resole resin, 2.05:1 formaldehyde to phenol ratio, viscosity 4,000 cP, appx. 50% solids in water | — |
| MB-CB | Polyvac MB-CB crosslinking PVA resin emulsion with | Franklin International |

TABLE 1-continued

| Material | Description | Source |
|---|---|---|
| 300M | 3.5 wt % N-methylolacrylamide Plyamul 300M non-crosslinking PVA resin emulsion | Franklin International |
| Soy Flour | Defatted soy flour | Honeymeade |

Examples 1-2

The following examples were prepared using a binder prepared from 43 pbw XBM-91, 18 pbw soy flour, and 35 pbw water.

TABLE 2

| Example | PF/PVA:Soy Flour:water (parts by weight) | PF/PVA composition | | | Viscosity (cP) | 3-Cycle Soak |
|---|---|---|---|---|---|---|
| | | PF (%) | MB-CB (%) | 300M (%) | | |
| 1 | 43:18:35 | 60 | 40 | — | 33,600 | Passed |
| 2 | 43:18:35 | 50 | 50 | — | 28,000 | Passed |
| 3 | 43:18:35 | 50 | — | 50 | 39,100 | Passed |

As seen in the data from Table 2, each of Examples 1-3 pass the plywood industry's standard 3 cycle soak test which demonstrates stability to hydrolytic decomposition of the adhesive, and which examines delamination of an article.

Example 3 and Comparative Examples 1-3

Formaldehyde emissions studies were done using the large chamber test in accordance with ASTM 1333. Adhesive binder for Example 3 that was made using an adhesive binder prepared using 48 parts by weight of a resin combination of phenol-formaldehyde resole resin and MB-CB having a weight ratio of 53:47; 18 parts by weight soy flour; and 35 parts by weight water, and using wood plies of Spruce to make a plywood panel was evaluated against background emissions from different wood types. The adhesive binder was applied to the veneer in an amount of 86 pounds per 1,000 square feet, and cured at a temperature of 110° C. and a pressure of 100-150 psi for 6.75-7.5 minutes. The results are shown in Table 3, below.

TABLE 3

| | Emissions |
|---|---|
| Example 3 | 0.033 |
| Comparative Example 1 (Douglas Fir) | 0.025-0.029 |
| Comparative Example 2 (Spruce) | 0.03 |
| Comparative Example 3 (Black Pine) | 0.03 |

Formaldehyde emission levels from this resin system were evaluated using the large chamber test described in ASTM E1333. Results indicate the HCHO emission levels for the wood composite of Example 3 are near background levels emitted from representative woods useful for preparing wood composites. Emission levels were 0.033 ppm. For comparison, Douglas fir (Comp. Ex. 1) gives a value of 0.025 to 0.029 ppm and spruce (Comp. Ex. 2) and black pine (Comp. Ex. 3)

show a slightly higher background of 0.03 ppm. The formaldehyde emissions from the adhesive binder compares favorably to background emissions.

The singular forms "a," "an," and "the" include plural referents unless the context clearly dictates otherwise. The endpoints of all ranges reciting the same characteristic or referring to the quantity of the same component are independently combinable and inclusive of the recited endpoint. All cited patents, patent applications, and other references are incorporated herein by reference in their entirety.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A wood composite comprising the cure product of an adhesive binder composition comprising a wood material and a thermosetting composition comprising,
    a phenol-formaldehyde resin,
    a polyvinyl ester resin, and
    a protein;
provided, however, the wood composite does not contain any added urea-formaldehyde resin.

2. The wood composite of claim 1 wherein the protein is a vegetable protein.

3. The wood composite of claim 2 wherein the vegetable protein comprises a soy protein.

4. The wood composite of claim 3 wherein the soy protein is a soy flour.

5. The wood composite of claim 1 wherein the wood material is hardwood for plywood.

6. The wood composite of claim 1 wherein the wood material is selected from the group consisting of wood flakes, wood fibers, wood particles, wood wafers, wood strips, wood strands, wood veneer and combinations thereof.

7. The wood composite of claim 1 wherein the phenol-formaldehyde resin has a formaldehyde to phenol mole ratio of about 0.7:1 to about 4:1.

8. The wood composite of claim 1 wherein the ratio of the combined weights of the phenol-formaldehyde and polyvinyl ester resin solids to the protein is about 90:10 to about 50:50 in the thermosetting compound.

9. The wood composite of claim 1 wherein the polyvinyl ester resin is a polyvinyl acetate.

10. The wood composite of claim 1 wherein the adhesive binder further comprises additives selected from the group consisting of formaldehyde scavengers, plasticizers, thickeners, fillers, flame retardants, lubricants, softening agents, pigments, biocides, wax, acidic cure catalysts, and combinations thereof.

11. A process for making the wood composite of claim 1 comprising combining a wood material with an adhesive binder comprising a thermosetting composition comprising
    a phenol-formaldehyde resin,
    a polyvinyl ester resin, and
    a protein;
consolidating the combined adhesive binder and wood material, and curing the combined adhesive binder and wood material.

12. The process of claim 11 wherein the protein is a vegetable protein.

13. The process of claim 12 wherein the vegetable protein comprises a soy protein.

14. The process of claim 13 wherein the soy protein is a soy flour.

15. The process of claim 11 wherein the wood material is selected from the group consisting of wood flakes, wood fibers, wood particles, wood wafers, wood strips, wood strands, wood veneer, and combinations thereof.

16. The process of claim 11 wherein the wood material is hardwood for plywood.

17. The process of claim 11 wherein the adhesive binder composition has a formaldehyde to phenol mole ratio of about 0.7:1 to about 4:1.

18. The process of claim 11 wherein the ratio of the combined weights of the phenol-formaldehyde and polyvinyl ester resin solids to the protein is about 90:10 to about 50:50 in the thermosetting compound.

19. The process of claim 11 wherein the adhesive binder further comprises additives selected from the group consisting of formaldehyde scavengers, plasticizers, thickeners, fillers, flame retardants, lubricants, softening agents, pigments, biocides, wax, acidic cure catalysts, and combinations thereof.

20. An adhesive binder, comprising a thermosetting composition comprising a
    phenol-formaldehyde resin,
    a polyvinyl ester resin, and
    a protein;
provided, however, the adhesive binder contains no urea-formaldehyde resin.

* * * * *